US012295016B2

(12) United States Patent
Matsumura et al.

(10) Patent No.: US 12,295,016 B2
(45) Date of Patent: May 6, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 350 days.

(21) Appl. No.: 17/906,030

(22) PCT Filed: Mar. 27, 2020

(86) PCT No.: PCT/JP2020/014294
§ 371 (c)(1),
(2) Date: Sep. 9, 2022

(87) PCT Pub. No.: WO2021/192300
PCT Pub. Date: Sep. 30, 2021

(65) Prior Publication Data
US 2023/0124015 A1 Apr. 20, 2023

(51) Int. Cl.
*H04L 1/1812* (2023.01)
*H04L 1/1829* (2023.01)
(Continued)

(52) U.S. Cl.
CPC ........... *H04W 72/30* (2023.01); *H04L 1/1812* (2013.01); *H04L 1/1861* (2013.01);
(Continued)

(58) Field of Classification Search
CPC . H04L 1/0001–248; H04L 5/0001–26; H04W 28/02–26; H04W 72/02–569;
(Continued)

(56) References Cited

U.S. PATENT DOCUMENTS

2014/0161016 A1  6/2014  Morioka et al.
2019/0387501 A1  12/2019  Park et al.
(Continued)

FOREIGN PATENT DOCUMENTS

JP   2014-529952 A   11/2014
WO  2018/056108 A1   3/2018

OTHER PUBLICATIONS

International Search Report issued in PCT/JP2020/014294 on Nov. 10, 2020 (2 pages).
(Continued)

*Primary Examiner* — Timothy J Weidner
(74) *Attorney, Agent, or Firm* — Osha Bergman Watanabe & Burton LLP

(57) ABSTRACT

A terminal according to one aspect of the present disclosure includes a receiving section that receives downlink control information (DCI) for scheduling a downlink shared channel of a multicast; and a control section that controls transmission of Hybrid Automatic Repeat reQuest ACKnowledgement (HARQ-ACK) with respect to the downlink shared channel based on the DCI, wherein the DCI is common to a plurality of terminals. According to one aspect of the present disclosure, a PDSCH using the multicast can be appropriately received.

6 Claims, 13 Drawing Sheets

(51) Int. Cl.
| | |
|---|---|
| *H04L 1/1867* | (2023.01) |
| *H04L 5/00* | (2006.01) |
| *H04W 28/04* | (2009.01) |
| *H04W 72/1273* | (2023.01) |
| *H04W 72/21* | (2023.01) |
| *H04W 72/23* | (2023.01) |
| *H04W 72/231* | (2023.01) |
| *H04W 72/232* | (2023.01) |
| *H04W 72/30* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04L 1/1893* (2013.01); *H04L 5/0055* (2013.01); *H04L 5/0076* (2013.01); *H04L 5/0094* (2013.01); *H04W 28/04* (2013.01); *H04W 72/1273* (2013.01); *H04W 72/21* (2023.01); *H04W 72/23* (2023.01); *H04W 72/231* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2020/0022144 A1 | 1/2020 | Papasakellariou | |
| 2021/0160879 A1* | 5/2021 | Lin | H04W 72/23 |
| 2021/0204097 A1* | 7/2021 | Takeda | H04W 72/21 |
| 2022/0264612 A1* | 8/2022 | Yang | H04W 72/23 |

OTHER PUBLICATIONS

Written Opinion of the International Searching Authority issued in PCT/JP2020/014294 on Nov. 10, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in the European Application No. 20926490.2, mailed Oct. 30, 2023 (7 pages).
Office Action issued in Chinese Patent Application No. 202080099222.7, mailed on Jul. 24, 2024 (14 pages).
Office Action issued in Japanese Patent Application No. 2022-510398, mailed on Jun. 4, 2024 (6 pages).

* cited by examiner

FIG. 2A

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | reserved |
| 30 | 4 | reserved | reserved |
| 31 | 6 | reserved | reserved |

FIG. 2B

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | reserved |
| 29 | 4 | reserved | reserved |
| 30 | 6 | reserved | reserved |
| 31 | 8 | reserved | reserved |

| DCI | TDRA |
|---|---|
| 00 | RESOURCE #0-0 |
| 01 | RESOURCE #0-1 |
| 10 | RESOURCE #0-2 |
| 11 | RESOURCE #0-3 |

WHEN mod (UE-DEDICATED RNTI, 2) = 0

| DCI | TDRA |
|---|---|
| 00 | RESOURCE #1-0 |
| 01 | RESOURCE #1-1 |
| 10 | RESOURCE #1-2 |
| 11 | RESOURCE #1-3 |

WHEN mod (UE-DEDICATED RNTI, 2) = 1

FIG. 4

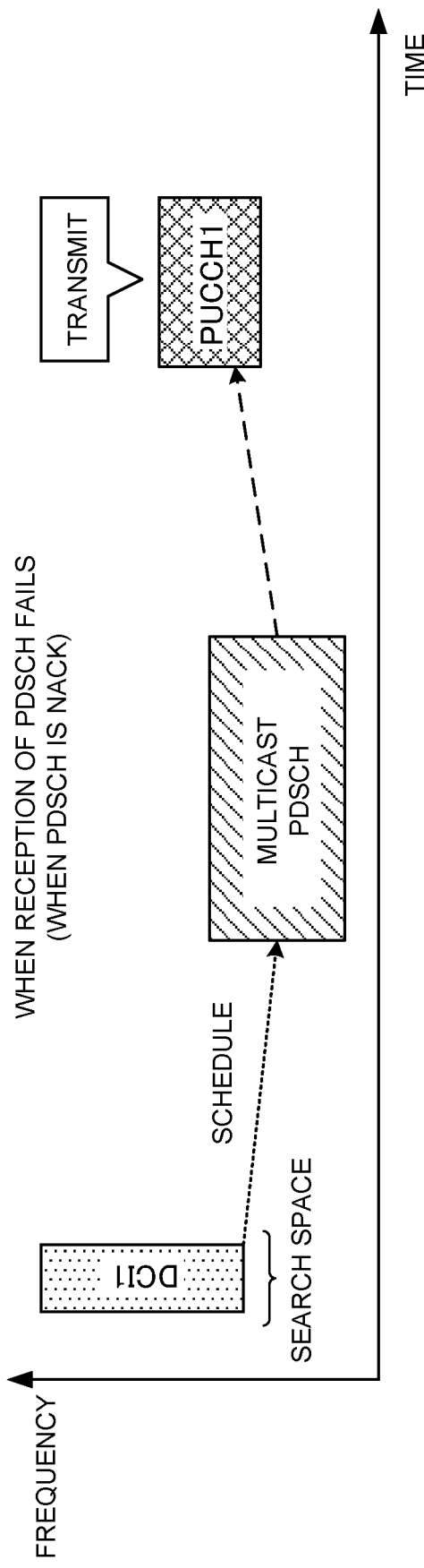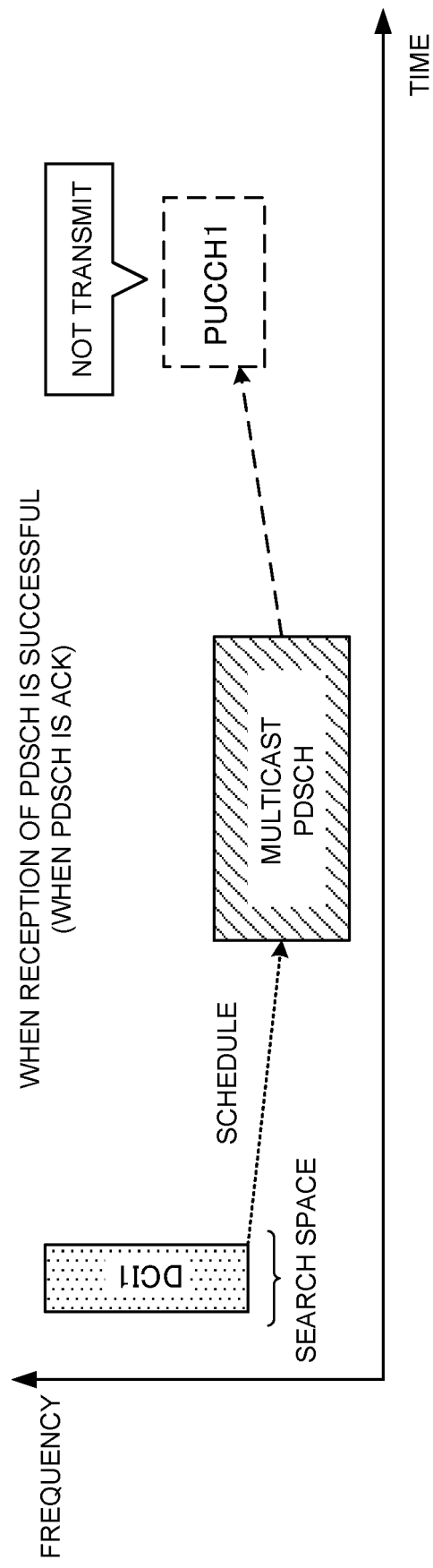

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (e.g., NR), a plurality of user terminals (User Equipment (UE)) are assumed to communicate under an ultra-high density and high traffic environment.

In the NR, under such an environment, the plurality of UEs are assumed to simultaneously receive the same PDSCH using a multicast.

However, in the past NR specifications, the receiving method for downlink control information (DCI) for scheduling the PDSCH using the multicast, and the transmitting method for HARQ-ACK corresponding to the PDSCH using the multicast of the UE are not sufficiently considered. Unless such methods are appropriately controlled, system performance may degrade such as the throughput may degrade.

One of the objects of the present disclosure is to provide a terminal, a radio communication method, and a base station that appropriately receive a PDSCH using a multicast.

Solution to Problem

A terminal according to one aspect of the present disclosure includes a receiving section that receives downlink control information (DCI) for scheduling a downlink shared channel of a multicast; and a control section that controls transmission of Hybrid Automatic Repeat reQuest ACKnowledgement (HARQ-ACK) with respect to the downlink shared channel based on the DCI, wherein the DCI is common to a plurality of terminals.

Advantageous Effects of Invention

According to one aspect of the present disclosure, the PDSCH using the multicast can be appropriately received.

BRIEF DESCRIPTION OF DRAWINGS

FIGS. 2A and 2B are diagrams to show an example of an MCS index table for the PDSCH;

FIG. 4 is a diagram to show an example of a correspondence relationship between a TDRA value and bits of the DCI for a PUSCH resource;

FIGS. 9A and 9B are diagrams to show an example of a method for transmitting the HARQ-ACK (PUCCH) corresponding to the multicast PDSCH in the plurality of UE-common PUCCH resources;

DESCRIPTION OF EMBODIMENTS (PUCCH Format)

Figure 1:
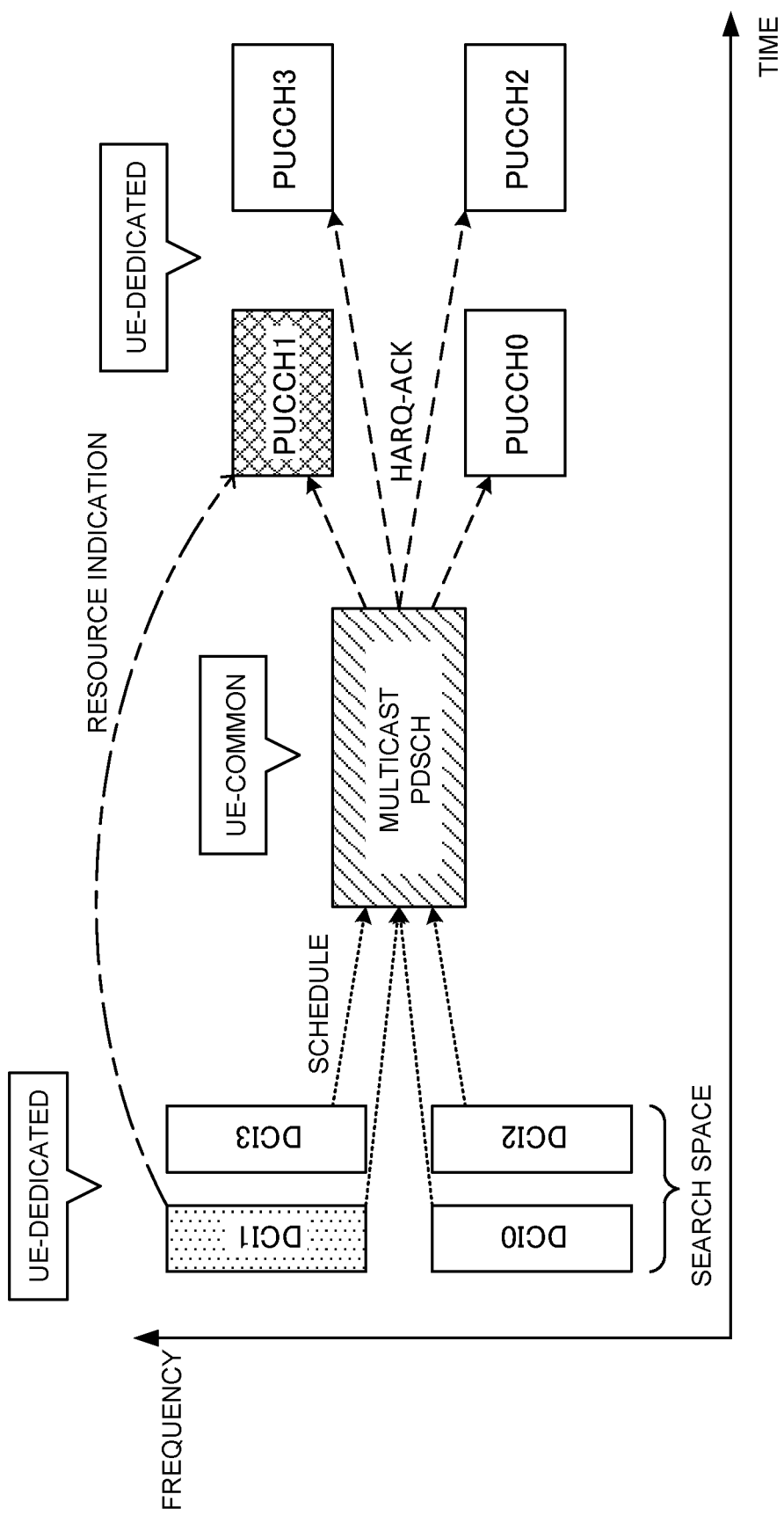
FIG. 1 is a diagram to show an example of a multicast PDSCH receiving procedure.

In future radio communication systems (e.g., Rel.15 or later versions, 5G, NR, and so on), a configuration (also referred to as format, PUCCH format (PF), and so on) for an uplink control channel (e.g., PUCCH) used for the transmission of uplink control information (UCI) is being considered.

For example, in Rel.15 NR, consideration is being made to support five types of PF0 to PF4.

Note that the names of the PFs described below are merely an exemplification, and different names may be used.

For example, PF0 and PF1 are PFs used for the transmission of the UCI of two or less bits (up to two bits). For example, the UCI may be at least one of transmission confirmation information (which may be also referred to as Hybrid Automatic Repeat reQuest ACKnowledgement (HARQ-ACK), acknowledgement (ACK) or negative-acknowledgement (NACK) and so on), and scheduling request (SR). PF0 can be allocated to one or two symbols, and thus is also referred to as short PUCCH or sequence-based short PUCCH, and the like. On the other hand, PF1 can be allocated to 4 to 14 symbols, and thus is also referred to as long PUCCH, and the like. PF0 may use a cyclic shift (CS) corresponding to the value of the UCI, and transmit a sequence obtained by the cyclic shift of the base sequence. In PF1, a plurality of user terminals may be subjected to code division multiplexing (CDM) within the same physical resource block (PRB) by the block-wise spreading of the time domain using at least one of CS and time domain (TD)-orthogonal cover code (OCC).

PF2 to PF4 are PFs used for the transmission of the UCI (e.g., channel state information (CSI)) or at least one of the CSI, the HARQ-ACK and the SR) exceeding two bits (more than two bits). PF2 can be allocated to one or two symbols, and thus is also referred to as short PUCCH, and the like. On the other hand, PF3 and PF4 can be allocated to 4 to 14 symbols, and thus are also referred to as long PUCCH, and the like. In PF4, a plurality of user terminals may be subjected to the CDM using the block-wise spreading of the (frequency domain (FD)-OCC) before the DFT.

An intra-slot frequency hopping may be applied to PF1, PF3, and PF4. When the length of the PUCCH is $N_{symb}$, the length before the frequency hopping (first hop) may be floor ($N_{symb}/2$), and the length after the frequency hopping (second hop) may be ceil ($N_{symb}/2$).

The waveforms of PF0, PF1, and PF2 may be Cyclic Prefix (CP)-Orthogonal Frequency Division Multiplexing (OFDM). The waveforms of PF3 and PF4 may be Discrete Fourier Transform (DFT)-spread(s)-OFDM.

The resources (e.g., PUCCH resources) used for the transmission of the uplink control channel are allocated using higher layer signaling and/or downlink control information (DCI). The higher layer signaling merely needs to be at least one of, for example, RRC (Radio Resource Control) signaling, system information (e.g., at least one of RMSI: Remaining Minimum System Information, OSI: Other System Information, MIB: Master Information Block, SIB: System Information Block), and broadcast information (PBCH (Physical Broadcast Channel)).

Furthermore, in the NR, the number of symbols allocated to the PUCCH (may be also referred to as PUCCH allocating symbol, PUCCH symbol, and so on) can be determined with any one of slot-specific, cell-specific, or user terminal-specific or combination thereof. Since the communication distance (coverage) is expected to increase as the number of PUCCH symbols increases, for example, an operation of increasing the number of symbols for user terminals distant from the base station (e.g., eNB, gNB) is assumed.

(NR Multicast/Broadcast)

In the NR up to Rel.16, the transmission of at least one of the signal and the channel (hereinafter expressed as signal/channel) from the NW to the UE is basically a unicast transmission. In this case, the same downlink (DL) data signal/channel (e.g., downlink shared channel (PDSCH) transmitted from the NW to a plurality of UEs is assumed to be received by each UE using a plurality of receiving opportunities (receiving occasions) corresponding to a plurality of beams (or panels) of the NW.

Furthermore, a case where a plurality of UEs simultaneously receive the same signal/channel under an ultra-high density and high traffic situation such as an environment (e.g., stadium, and so on) where a great number of UEs are geographically crowded together is assumed. In such a case, when the plurality of UEs are present in the same area and each UE receives the signal/channel through the unicast so that each UE receives the same signal/channel, the communication reliability can be ensured but the resource utilization efficiency may degrade.

A use case (e.g., television, radio and so on) that performs multicasting (broadcasting) of transmitting the same DL data signal/channel to a plurality of UEs also exists. However, in such a use case, the NW does not carry out the reception confirmation of the DL data signal/channel of each UE, and hence the reliability is difficult to ensure.

The inventors of the present invention thus came up with the idea of a receiving method for downlink control information (DCI) for scheduling the PDSCH using the multicast, and a transmitting method for transmission confirmation information (e.g., which may be also referred to as Hybrid Automatic Repeat reQuest ACKnowledgement (HARQ-ACK), ACK/NACK and so on) corresponding to the PDSCH using the multicast of the UE.

Embodiments according to the present disclosure will be described in detail with reference to the drawings as follows. The radio communication method according to each embodiment may be employed independently or may be employed in combination.

(Radio Communication Method)

The multicast/broadcast may be configured from the NW to a plurality of UEs. The multicast/broadcast may be configured using the higher layer signaling.

The UE, to which the multicast/broadcast is configured, may receive the PDSCH scheduled by the DCI (PDCCH) blind detected (received) in at least one of the downlink control channel (PDCCH) monitoring occasion, search space, and control resource set (CORESET) corresponding to the multicast/broadcast. The PDSCH may be also called the PDSCH using the multicast.

Furthermore, the UE, to which the multicast/broadcast is configured, may transmit the HARQ-ACK/NACK with respect to the PDSCH using the multicast using the PUCCH or the PUSCH.

The HARQ-ACK/NACK may transmit one bit of HARQ-ACK/NACK for every one transport block (TB)/code word (CW) of the PDSCH using the multicast or may transmit one bit of HARQ-ACK/NACK for every plurality of TBs/CWs.

Here, for example, the higher layer signaling may be any one or combinations of Radio Resource Control (RRC) signaling, Medium Access Control (MAC) signaling, broadcast information, and the like.

For example, the MAC signaling may use MAC control elements (MAC CE), MAC Protocol Data Units (PDUs), and the like. For example, the broadcast information may be master information blocks (MIBs), system information blocks (SIBs), minimum system information (Remaining Minimum System Information (RMSI)), other system information (OSI), and the like.

For example, the physical layer signaling may be downlink control information (DCI).

In the present disclosure, the multicast may be interchangeably interpreted as the broadcast (notification information). Furthermore, the PDSCH using the multicast may be interchangeably interpreted as a plurality of UE-common PDSCHs, common PDSCH, shared PDSCH, multicast PDSCH, broadcast (notification) PDSCH, and the like.

In the present disclosure, the phrase "A/B" may mean that "at least one of A and B."

In the present disclosure, the HARQ-ACK transmission PUCCH/PUSCH resource corresponding to the multicast PDSCH may be also simply called HARQ-ACK transmission resource.

In the present disclosure, each of the plurality of UEs may be called each UE or simply UE.

First Embodiment

For a plurality of HARQ-ACK transmission resources allocated to a plurality of UEs corresponding to the downlink shared channel (PDSCH) using the multicast, each UE may transmit the HARQ-ACK using UL resources (orthogonal UL resources) orthogonal to (not overlapping) each other. In other words, the UE-dedicated (or UE-specific) HARQ-ACK transmission PUCCH/PUSCH resource may be allocated to each UE. This case will be described in detail in a second embodiment and a third embodiment below.

For a plurality of HARQ-ACK transmission resources allocated to a plurality of UEs corresponding to the downlink shared channel (PDSCH) using the multicast, each UE may transmit the HARQ-ACK using the UL resources (non-orthogonal UL resources) not orthogonal to (at least partially overlapping) each other. In other words, the UE-dedicated HARQ-ACK transmission PUCCH/PUSCH resource may not be allocated to each UE, and the HARQ-ACK transmission PUCCH/PUSCH resource overlapping (common) among the plurality of UEs may be allocated. This case will be described in detail in the third embodiment and a fourth embodiment below.

Second Embodiment

In a second embodiment, a case where a plurality of UEs transmit the HARQ-ACK using the orthogonal UL resource will be described. Specifically, a case where each UE receives the UE-dedicated DCI, and each DCI schedules the PDSCH (multicast PDSCH) common to the plurality of UEs and instructs the UE-dedicated HARQ-ACK transmission PUCCH/PUSCH resource corresponding to the multicast PDSCH will be described.

FIG. 1 is a diagram to show an example of a multicast PDSCH receiving procedure. In FIG. 1, a certain UE monitors the UE-dedicated DCI (at least DCI1 of DCI0 to DCI3), receives the multicast PDSCH, and transmits the HARQ-ACK corresponding to the multicast PDSCH using the UE-dedicated PUCCH resource (at least PUCCH1 of PUCCH0 to PUCCH3).

Note that the number of DCIs, PDSCHs, and PUCCH resources, and the time/frequency allocating positions shown in FIG. 1 are merely an example, and this is not the sole case.

<<Search Space>>

The search space for monitoring the UE-dedicated DCI may be a common search space or may be a UE-specific search space. Furthermore, the search space for monitoring the UE-dedicated DCI may be a search space (or control resource set (CORESET)) dedicated to multicast/broadcast scheduling defined in the specification.

<<RNTI>>

The UE-dedicated DCI may be cyclic redundancy check (CRC) scrambled by the UE-dedicated Radio Network Temporary Identifier (RNTI) (e.g., cell (C-)RNTI) or may be CRC scrambled by the UE-common RNTI. Furthermore, the UE-dedicated DCI may be CRC scrambled by the RNTI dedicated to multicast/broadcast scheduling defined in the specification.

<<PUCCH/PUSCH Resource>>

The HARQ-ACK transmission PUCCH resource may be instructed by at least one of PUCCH resource indicator (PRI) included in the DCI (scheduling DCI) for scheduling the multicast PDSCH and a control channel element (CCE) index (e.g., first CCE index) of the PDCCH that carries the relevant DCI. Furthermore, N (N is an integer, e.g., 16) PUCCH resources may be configured to each UE by the higher layer signaling (e.g., RRC signaling), and the HARQ-ACK transmission PUCCH resource may be specified by at least one of the PRI included in the scheduling DCI and the CCE index of the PDCCH for the DCI from the N PUCCH resources.

M (M is an integer) time/frequency resources may be configured to each UE by the higher layer signaling (e.g., RRC signaling), and the HARQ-ACK transmission PUSCH resource may be specified by at least one of the time domain resource assignment (TDRA) field and the frequency domain resource assignment (FDRA) field included in the DCI.

<<DCI Format>>

The multicast PDSCH may be scheduled by DCI format 1_1/1_0 or may be scheduled by the DCI format dedicated to multicast PDSCH.

When the multicast PDSCH is scheduled by DCI format 1_1/1_0, the conventional DCI format can be used, and thus the UE is easily mounted. Furthermore, when the multicast PDSCH is scheduled by DCI format 1_0 having few UE-dedicated fields, the multicast PDSCH, which is the UE-common PDSCH, can be efficiently scheduled.

When the multicast PDSCH is scheduled by the DCI format dedicated to multicast PDSCH, the UE may report the UE capability information related to the necessity of support of the DCI format dedicated to multicast PDSCH to the network (NW, e.g., gNB). In this case, the combination of the DCI size (payload size, number of bits) increases, the number of blind detections of the DCI performed by the UE increases, and the complexity of the UE operation increases, and hence only the UE supporting the DCI format may monitor the DCI format.

Furthermore, when the multicast PDSCH is scheduled by DCI format 1_0, and the reception of the multicast PDSCH is configured by the higher layer signaling and the DCI is CRC scrambled with the RNTI dedicated to multicast/broadcast scheduling, the UE may control the receiving process of the multicast PDSCH by interpreting the field value included in DCI format 1_0 as the multicast parameter without changing the size of DCI format 1_0. In this case, the UE may use DCI format 1_0 that is not CRC scrambled with the RNTI dedicated to multicast/broadcast scheduling for applications other than the scheduling of the multicast PDSCH.

Furthermore, when the multicast PDSCH is scheduled by DCI format 1_0 and the reception of the multicast PDSCH is configured by the higher layer signaling, the UE may control the receiving process of the multicast PDSCH by interpreting the field included in DCI format 1_0 as the multicast parameter without changing the size of DCI format 1_0.

When the multicast PDSCH is scheduled by DCI format 1_0, the UE may use, for the scheduling of the multicast PDSCH, at least one of DCI format identifier field, frequency domain resource assignment field, time domain resource assignment field, mapping field from the virtual resource block (VRB) to the physical resource block (PRB), new data indicator (NDI) field, redundant version (RV) field, HARQ process number field, downlink assignment index (DAI) field, scheduled PUCCH transmission power control (TPC) command field, PRI field, and timing indicator (PDSCH-to-HARQ feedback timing indicator (HARQ feedback timing indicator)) field from PDSCH to HARQ feedback among the fields included in DCI format 1_0.

Furthermore, when the multicast PDSCH is scheduled by DCI format 1_0, the UE may not use, for the scheduling of the multicast PDSCH, the modulation and coding scheme (MCS) field among the fields included in DCI format 1_0. In this case, the MCS parameter or the MCS index of the multicast PDSCH may take a certain value.

The certain value may be defined in the specification. For example, the certain value may be the smallest (or Xth smallest) MCS index in the MCS index table for the PDSCH defined in the specification in advance. Furthermore, the certain value may be notified to the UE by the higher layer signaling. The certain value may be also a value notified to the NW by UE capability information.

In view of the reliability of the multicast, it is conceivable that 256 quadrature amplitude modulation (QAM) is not used for the multicast PDSCH. In this case, a table not including the 256QAM parameter (MCS index table 1 for the PDSCH (FIG. 2A)) and a table including the 256QAM parameter (MCS index table 2 for the PDSCH (FIG. 2B)) may be defined in the specification.

In this case, the UE may determine at least one of modulation order, target code rate, and spectral efficiency from the MCS index using the MSC index table 1 with respect to the MCS index of the multicast PDSCH. Specifically, in the scheduling of the multicast PDSCH, the UE may reference the MCS index table 1 when the higher layer parameter (MCS-Table-PDSCH, mcs-Table) is not set in the MCS index table 2 (256 QAM table, 'qam256') and the DCI CRC scrambled by the C-RNTI is received.

Note that each value in the MCS index tables for the PDSCH shown in FIGS. 2A and 2B is merely an example, and this is not the sole case. The MCS index table may be interpreted as a table that does not include a modulation order of greater than or equal to a specific value (e.g., 8).

Regardless of whether to define the DCI format dedicated to multicast PDSCH scheduling, whether to define the RNTI dedicated to multicast PDSCH scheduling, and whether to interpret the field included in DCI format 1_0, the UE may not use, for the scheduling of the multicast PDSCH, the MCS field among the fields included in DCI format 1_0.

In this case, the UE can distinguish between the DCI for scheduling the multicast PDSCH and the DCI for scheduling other PDSCHs according to the presence or absence of the MCS field, and can utilize the field not used in the DCI for scheduling the multicast PDSCH in other applications (e.g., increasing bit fields of the TDRA/FDRA field).

Third Embodiment

In a third embodiment, a case where a plurality of UEs transmit the HARQ-ACK using the orthogonal UL resource will be described. Specifically, a case where each UE receives a plurality of UE-common DCIs, and the DCI schedules the PDSCH (multicast PDSCH) common to a plurality of UEs, and instructs the UE-dedicated HARQ-ACK transmission PUCCH/PUSCH resource corresponding to the multicast PDSCH will be described. Note that in the present embodiment, the second embodiment may be applied to some UEs of the plurality of UEs.

Figure 3:
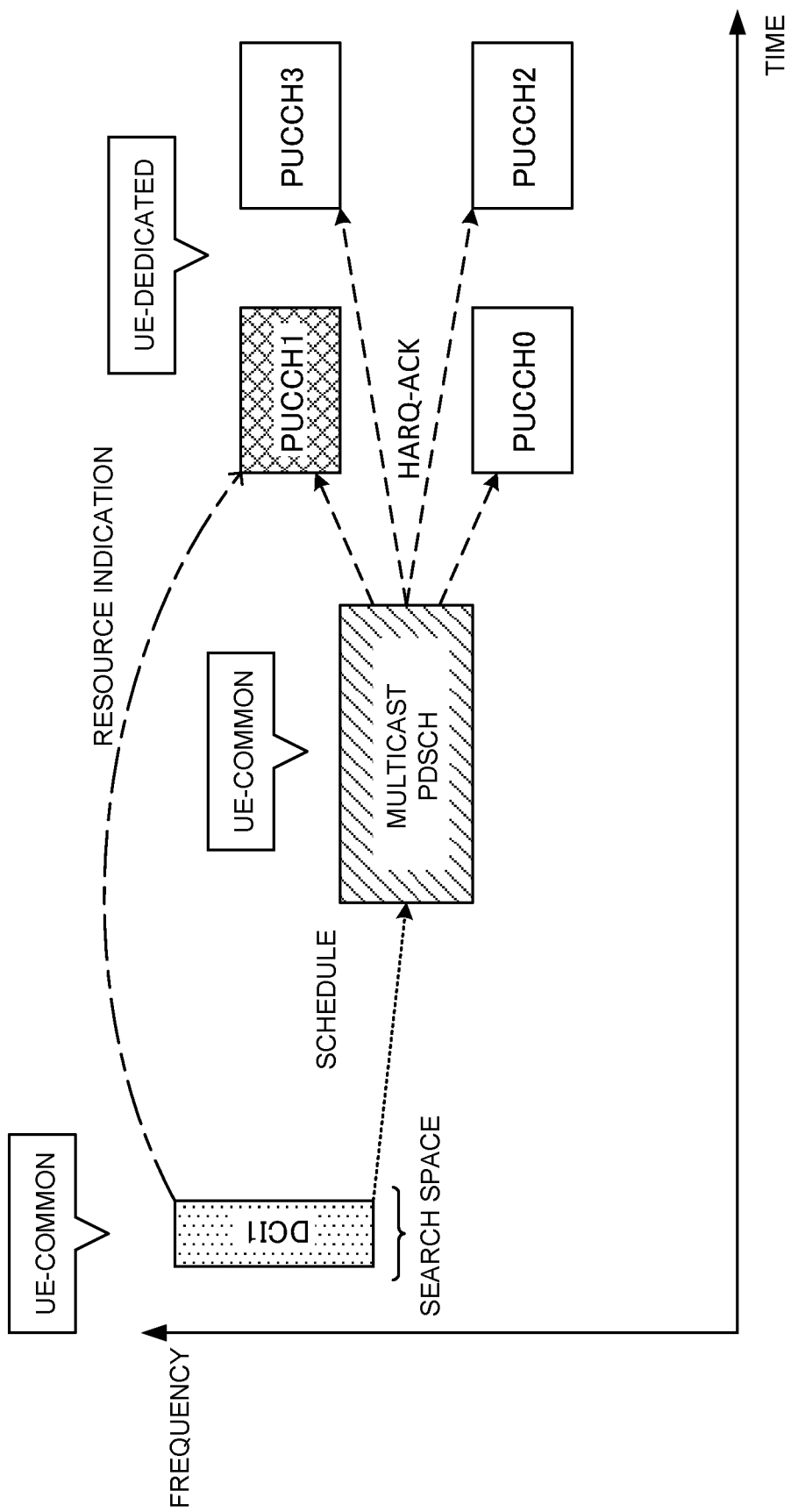
FIG. 3 is a diagram to show an example of the multicast PDSCH receiving procedure.

FIG. 3 is a diagram to show an example of the multicast PDSCH receiving procedure. In FIG. 3, a certain UE monitors the UE-common DCI (DCI1), receives the multicast PDSCH, and transmits the HARQ-ACK corresponding to the multicast PDSCH using the UE-dedicated PUCCH resource (at least PUCCH1 of PUCCH0 to PUCCH3).

Note that the number of DCIs, PDSCHs, and PUCCH resources, and the time/frequency allocating positions shown in FIG. 3 are merely an example, and this is not the sole case.

<<Search Space>>

The search space for monitoring the UE-common DCI may be a common search space or may be a UE-specific search space. Furthermore, the search space for monitoring the UE-common DCI may be a search space (or control resource set (CORESET)) dedicated to multicast/broadcast scheduling defined in the specification.

<<RNTI>>

The UE-common DCI may be CRC scrambled by the UE-dedicated radio network temporary identifier (RNTI) (e.g., cell (C-) RNTI) or may be CRC scrambled by the UE-common RNTI. The UE-common RNTI may be a newly defined RNTI. Furthermore, the UE-dedicated DCI may be CRC scrambled by the RNTI dedicated to multicast/broadcast scheduling defined in the specification.

<<PUSCH/PUCCH Resource>>

M (M is an integer) time/frequency resources may be configured to each UE by the higher layer signaling (e.g., RRC signaling), and the HARQ-ACK transmission PUSCH resource may be specified by at least one of the TDRA field and the FDRA field included in the DCI.

The HARQ-ACK transmission PUCCH resource may be instructed by at least one of the PRI included in the DCI (scheduling DCI) for scheduling the multicast PDSCH and the CCE index (e.g., first CCE index) of the PDCCH that carries the DCI. Furthermore, N (N is an integer, e.g., 16) PUCCH resources may be configured to each UE by the higher layer signaling (e.g., RRC signaling), and the HARQ-ACK transmission PUCCH resource may be specified by at least one of the PRI included in the scheduling DCI and the CCE index of the PDCCH that carries the DCI from the N PUCCH resources.

However, when the UE performs the determination method of the HARQ-ACK transmission PUSCH/PUCCH resource corresponding to the multicast PDSCH as described above, there is a concern that the PUSCH/PUCCH resources of the plurality of UEs may overlap. Hereinafter, a method for avoiding the overlapping of the PUSCH/PUCCH resources of the plurality of UEs will be described.

The UE may transmit the HARQ-ACK corresponding to the multicast PDSCH using the PUSCH based on a configured grant. In the present disclosure, the PUSCH based on the configured grant may be interpreted as a configured grant based PUSCH, a configured grant PUSCH, a PUSCH using the configured grant, and the like. In this case, the UE may be configured with the configured grant, and use the PUSCH resource configured by the configured grant to transmit the HARQ-ACK corresponding to the multicast PDSCH. When the reception of the multicast PDSCH is configured, the UE may assume that the configured grant (and PUSCH resource) is configured.

At this time, the UE may use the value of the HARQ-ACK timing indicator (PDSCH-to-HARQ feedback timing indicator) field included in DCI format 1_0 for the transmission of the HARQ-ACK corresponding to the multicast PDSCH. When the PUSCH resource by the configured grant is configured in the time domain (e.g., slot) indicated by the HARQ-ACK timing indicator field, the UE may transmit the HARQ-ACK corresponding to the multicast PDSCH.

Furthermore, when the PUSCH resource by the configured grant is not configured in the time domain indicated by the HARQ-ACK timing indicator field, the UE may not transmit the HARQ-ACK corresponding to the multicast PDSCH.

Moreover, when the PUSCH resource by the configured grant is not configured in the time domain indicated by the HARQ-ACK timing indicator field, the UE may hold (store) the HARQ-ACK bit corresponding to the multicast PDSCH, and transmit the HARQ-ACK corresponding to the multicast PDSCH in the PUSCH resource by the configured grant in the next transmission occasion (timing).

Furthermore, when the PUSCH resource by the configured grant is not configured in the time domain indicated by the HARQ-ACK timing indicator field, the UE may drop the HARQ-ACK bit corresponding to the multicast PDSCH. The UE may generate and transmit a HARQ-ACK corresponding to a new multicast PDSCH in the PUSCH resource by the configured grant in the next transmission occasion (timing).

Furthermore, the UE may be configured with the PUCCH resource for transmitting HARQ-ACK corresponding to the multicast PDSCH. The PUCCH resource may be configured with a PUCCH resource for transmitting an HARQ-ACK corresponding to a unicast PDSCH (at least one of PUCCH format, starting symbol, duration (number of symbols), physical resource block (PRB) index (first PRB index, e.g., at least one of starting PRB index and second hop PRB index), and initial cyclic shift (CS) index). The PUCCH resource may be configured to the UE by the higher layer signaling.

The UE may be configured/activated with periodic or semi-persistent PUCCH resource (also referred to as configured PUCCH resource) for transmitting the HARQ-ACK corresponding to the multicast PDSCH. In other words, when the multicast PDSCH is configured, the UE may assume that the HARQ-ACK transmission PUCCH resource is a configured PUCCH resource. The UE may be configured with the configured PUCCH resource by the higher layer signaling. The configuration of the configured PUCCH resource may include a parameter indicating the period of the PUCCH.

The UE may transmit the HARQ-ACK corresponding to the multicast PDSCH using the configured PUCCH resource.

At this time, the UE may use the value of the HARQ-ACK timing indicator field included in DCI format 1_0 for the transmission of the HARQ-ACK corresponding to the multicast PDSCH. When the configured PUCCH resource for transmitting the HARQ-ACK corresponding to the multicast PDSCH is configured in the time domain (e.g., slot) indicated by the HARQ-ACK timing indicator field, the UE may transmit the HARQ-ACK corresponding to the multicast PDSCH.

Furthermore, when the configured PUCCH resource for transmitting the HARQ-ACK corresponding to the multicast PDSCH is not configured in the time domain indicated by the HARQ-ACK timing indicator field, the UE may not transmit the HARQ-ACK corresponding to the multicast PDSCH.

Moreover, when the configured PUCCH resource for transmitting the HARQ-ACK corresponding to the multicast PDSCH is not configured in the time domain indicated by the HARQ-ACK timing indicator field, the UE may hold (store) the HARQ-ACK bit corresponding to the multicast PDSCH, and transmit the HARQ-ACK corresponding to the multicast PDSCH in the PUCCH resource configured for transmitting the HARQ-ACK corresponding to the multicast PDSCH in the next transmission occasion (timing).

When the configured PUCCH resource for transmitting the HARQ-ACK corresponding to the multicast PDSCH is not configured in the time domain indicated by the HARQ-ACK timing indicator field, the UE may drop the HARQ-ACK bit corresponding to the multicast PDSCH. The UE may generate and transmit an HARQ-ACK corresponding to a new multicast PDSCH in the configured PUCCH resource for transmitting the HARQ-ACK corresponding to the multicast PDSCH in the next transmission occasion (timing).

Note that in the present disclosure, the PUSCH resource by the configured grant, the configured PUCCH resource, the resource based on the configured grant, and the like may be interchangeably interpreted.

The HARQ-ACK transmission PUSCH/PUCCH resource corresponding to the multicast PDSCH may be instructed by the DCI having the CRC scrambled by at least one of the UE index (ID) or the RNTI.

In this case, the RNTI used for determining the HARQ-ACK transmission PUSCH/PUCCH resource corresponding to the multicast PDSCH may be a UE-dedicated RNTI (e.g., C-RNTI). In other words, the RNTI used for determining the HARQ-ACK transmission PUSCH/PUCCH resource corresponding to the multicast PDSCH may be different from the UE-common RNTI used for the CRC scramble of the DCI for scheduling the multicast PDSCH.

The HARQ-ACK transmission PUSCH/PUCCH resource corresponding to the multicast PDSCH may be instructed by at least one of a first method or a second method described below.

[First Method]

The UE may convert at least one of time resource, frequency resource, code, CS, and sequence of the PUCCH resource determined by the PRI/CCE index through a certain conversion equation for the HARQ-ACK transmission PUCCH resource corresponding to the multicast PDSCH. The UE may also assume that at least one of the time resource, frequency resource, code, CS, and sequence of the PUCCH resource determined by the PRI/CCE index is converted through a certain conversion equation for the HARQ-ACK transmission PUCCH resource corresponding to the multicast PDSCH.

The conversion equation may be determined based on the UE-dedicated RNTI (e.g., C-RNTI). For example, the conversion equation may be given by mod ({value of UE-dedicated RNTI}, M) (M is an arbitrary integer). Note that, mod (X, Y) means the remainder when X is divided by Y (modulo arithmetic).

The value M used in the conversion equation may be defined in the specification in advance or may be determined by the higher layer signaling. The utilization efficiency of the PUCCH resource and the PUCCH resource collision possibility between UEs can be controlled by the value of M.

[Second Method]

Furthermore, the UE may assume that the maximum number of the number of PUCCH resources configured by the higher layer signaling is larger than the maximum number defined in Rel.16 for the HARQ-ACK transmission PUCCH resource corresponding to the multicast PDSCH. In this case, the UE may determine the PUCCH resource based on the UE-dedicated RNTI (e.g., C-RNTI) in addition to the PRI/CCE index.

A method for instructing the PUCCH resource with respect to the UE is, for example, the maximum number 8 of the PUCCH resources included in the 2nd PUCCH resource set until Rel.16, and the UE determines the PUCCH resource by 3 bits of PRI. In this case, when 16 PUCCH resources are configured with respect to the 2nd PUCCH resource set, one PUCCH resource may be determined from the 16 PUCCH resources using the value derived from mod ({value of UE-dedicated RNTI}, M) and the PRI. The value M may be a value obtained by dividing the maximum number of PUCCH resources included in the PUCCH resource set by the maximum number of PUCCH resources included in the PUCCH resource set until Rel.16.

Furthermore, the UE may determine (may be instructed) the TDRA/FDRA for the PUSCH resource based on a certain conversion equation from the configured value (e.g., TDRA/FDRA table) of the TDRA/FDRA for a plurality of PUSCH resources configured by the higher layer signaling for the HARQ-ACK transmission PUSCH resource corresponding to the multicast PDSCH. The conversion equation may be mod ({value of UE-dedicated RNTI}, M) (M is an arbitrary integer).

FIG. 4 is a diagram to show an example of a correspondence relationship between the TDRA value and the bits of the DCI for the PUSCH resource.

FIG. 4 is an example showing the relationship between the TDRA value and the bits of the DCI for the PUSCH resource, but the correspondence relationship (table) showing the relationship between the FDRA value for the PUSCH resource and the bits of the DCI may be configured as a configured value, or the correspondence relationship (table) showing the relationship between the TDRA value and the FDRA value for the PUSCH resource, and the bits of the DCI may be configured as a configured value.

The UE may use the correspondence relationship (table) as shown in FIG. 4 to determine the TDRA of the HARQ-ACK transmission PUSCH resource corresponding to the multicast PDSCH. A plurality of TDRA tables may be configured by the higher layer signaling, and the UE may determine the TDRA table of the PUSCH resource to use from the mod ({value of UE-dedicated RNTI}, M).

FIG. 4 shows a case for M=2, but M and the values described in the table are merely an example, and this is not the sole case.

Note that when the value of the UE-dedicated RNTI is expressed with a binary number, the UE may convert the value of the UE-dedicated RNTI to a decimal value and perform the modulo arithmetic mentioned above.

<<DCI Format>>

The DCI common to a plurality of UEs for scheduling the multicast PDSCH may be DCI format 1_1/1_0 or may be a DCI format dedicated to multicast PDSCH.

When the multicast PDSCH is scheduled by DCI format 1_1/1_0, the conventional DCI format can be used, and thus the UE is easily mounted. Furthermore, when the multicast PDSCH is scheduled by DCI format 1_0 having few UE-dedicated fields, the multicast PDSCH, which is the UE-common PDSCH, can be efficiently scheduled.

When the multicast PDSCH is scheduled by the DCI format dedicated to multicast PDSCH, the UE may report the UE capability information related to the necessity of support of the DCI format dedicated to multicast PDSCH to the network (NW, e.g., gNB). In this case, the combination of the DCI size (payload size, number of bits) increases, the number of blind detections of the DCI performed by the UE increases, and the complexity of the UE operation increases, and hence only the UE supporting the DCI format may monitor the DCI format.

Furthermore, when the multicast PDSCH is scheduled by DCI format 1_0, and the reception of the multicast PDSCH is configured by the higher layer signaling and the DCI is CRC scrambled with the RNTI dedicated to multicast/broadcast scheduling, the UE may control the receiving process of the multicast PDSCH by interpreting the field value included in DCI format 1_0 as the multicast parameter without changing the size of DCI format 1_0. In this case, the UE may use DCI format 1_0 that is not CRC scrambled with the RNTI dedicated to multicast/broadcast scheduling for applications other than the scheduling of the multicast PDSCH.

Furthermore, when the multicast PDSCH is scheduled by DCI format 1_0 and the reception of the multicast PDSCH is configured by the higher layer signaling, the UE may control the receiving process of the multicast PDSCH by interpreting the field included in DCI format 1_0 as the multicast parameter without changing the size of DCI format 1_0.

When the multicast PDSCH is scheduled by DCI format 1_0, the UE may use, for the scheduling of the multicast PDSCH, at least one of DCI format identifier field, frequency domain resource assignment field, time domain resource assignment field, mapping field from the VRB to the physical resource block PRB, NDI field, RV field, HARQ process number field, and downlink assignment index among the fields included in DCI format 1_0.

Furthermore, when the multicast PDSCH is scheduled by DCI format 1_0, the UE may not use, for the scheduling of the multicast PDSCH, the modulation and coding scheme (MCS) field among the fields included in DCI format 1_0. For this case, a method that does not use the MCS field described in the second embodiment for the scheduling of the multicast PDSCH may be applied.

A method for resource instruction, timing (value) instruction, and TPC command (value) instruction of the UE-dedicated PUCCH will be described by each UE-common DCI. In the Rel.16 NR, the TPC command for the scheduled PUCCH has 2 bits, the PRI field has 3 bits, and the HARQ feedback timing indicator field has 3 bits, respectively.

When the multicast PDSCH is scheduled by DCI format 1_0, the UE may not use a specific field of at least one of the value of the TPC command for the scheduled PUCCH, the value of the PRI field, and the value of the HARQ feedback timing indicator field among the fields included in DCI format 1_0.

In this case, the UE may ignore the value of the specific field indicated by DCI format 1_0, and assume to use a certain value. Such a certain value may be a value obtained by determining a value of the field indicated by DCI format 1_0 with a certain conversion equation, or may be a value notified to the UE by the UE-dedicated higher layer signaling.

The UE may determine the resource/value to use assuming the bit converted by a certain conversion equation. The conversion method by the conversion equation will described later in the conversion method of the field (resource/value).

Furthermore, the UE the UE may use the resource/value obtained by converting the resource/value indicated by the value of the field indicated by DCI format 1_0 with a certain conversion equation.

Note that the conversion equation may convert the resource/value using at least the UE-dedicated index/ID (e.g., C-RNTI). The conversion equation may convert the resource/value using an offset value notified to the UE-dedicated by the higher layer signaling. In this case, for example, offsets such as offset=+p with respect to the PRB index, offset=+q (p, q are arbitrary values) with respect to the initial CS index and the like are notified to the UE, and the UE may determine the resource/value to use (e.g., PRB index, initial CS index, and so on) by adding (or subtracting) the offset value with respect to the index of the PUCCH resource instructed by the PRI/CCE index.

Regardless of whether to define the DCI format dedicated to multicast PDSCH scheduling, whether to define the RNTI dedicated to multicast PDSCH scheduling, and whether to interpret the field included in DCI format 1_0, the UE may not use, for the scheduling of the multicast PDSCH, at least one of the TPC command for the scheduled PUCCH, the PRI field, and the HARQ feedback timing indicator field among the fields included in DCI format 1_0. In this case, the UE can distinguish between the DCI for scheduling the multicast PDSCH and the DCI for scheduling other PDSCHs according to the presence or absence of at least one of the TPC command for the scheduled PUCCH, the PRI field, and the HARQ feedback timing indicator field, and can utilize the field not used in the DCI for scheduling the multicast PDSCH in other applications (e.g., increasing bit fields of the TDRA/FDRA field).

When the multicast PDSCH is scheduled by DCI format 1_0, the UE may not use, for the scheduling of the multicast PDSCH, the TPC command for the scheduled PUCCH among the fields included in DCI format 1_0. In this case, the TPC command of the multicast PDSCH may take a certain value.

That is, the certain value may be 0. In other words, the UE does not need to assume a closed loop (CL)—power control (PC). Furthermore, the certain value may be defined by the specification with a certain bit string (e.g., bit 00), may be configured by the higher layer signaling, or may be a value reported to the NW as UE capability information.

Regardless of whether to define the DCI format dedicated to multicast PDSCH scheduling, whether to define the RNTI dedicated to multicast PDSCH scheduling, and whether to interpret the field included in DCI format 1_0, the UE may not use, for the scheduling of the multicast PDSCH, the TPC command field among the fields included in DCI format 1_0. In this case, the DCI for scheduling multicast PDSCH and the DCI for scheduling other PDSCHs can be distinguished, and the field that is not used in the DCI for scheduling the multicast PDSCH can be utilized in other applications (e.g., increasing bit fields of the TDRA/FDRA field).

In this case, the UE may use the TPC command field included in DCI format 1_0 that is not used for the scheduling of the multicast PDSCH for the switching of at least one of the conversion method of the bit field value included in the DCI for each UE and the conversion method of the PUCCH resource. The conversion method of the bit field value included in the DCI for each UE and the conversion method of the PUCCH resource will be described in detail below.

For example, the bit field (value)/PUCCH resource conversion rule of each UE may be defined in advance with a plurality of patterns (e.g., four patterns), and the UE may determine one pattern from the plurality of patterns using the value of the TPC command field.

The pattern may be determined to be a pattern corresponding to the value obtained with the certain conversion equation. The conversion equation may be determined based on the UE-dedicated RNTI (e.g., C-RNTI). For example, the conversion equation may be given by mod ({value of UE-dedicated RNTI}, M) (M is an arbitrary integer). The value M used in the conversion equation may be defined in the specification in advance or may be determined by the higher layer signaling. The utilization efficiency of the PUCCH resource and the PUCCH resource collision possibility between UEs can be controlled by the value of M.

Note that in the description made above, the method using the TPC command field has been described, but the field other than the TPC command field included in DCI format 1_0 (e.g., PRI field, HARQ feedback time indicator field from PDSCH) may be used or the higher layer signaling may be used.

[Conversion Method of Field (Resource/Value)]

Hereinafter, a method for converting the field value (resource/value indicated thereby) included in a plurality of UE-common DCIs to a UE-dedicated value (resource/value indicated thereby) will be described. The method described in detail here can be appropriately applied to other embodiments as well. The conversion rule of the bit field (bit string) indicated below may be notified to each UE by the UE-dedicated higher layer signaling or may be judged by each UE based on the UE index (RNTI).

The UE may determine the resource/value to use assuming the bit converted by a certain conversion equation. For example, when the field value is X bits, the UE may use a value determined by performing at least one of addition, subtraction, and exclusive OR (EXOR) calculation to the X bit value notified by the higher layer signaling or the X bit value determined based on the UE index (RNTI) with respect to the field value.

Furthermore, the UE may sort the field values included in the plurality of UE-common DCIs based on a certain rule to determine the resource/value to use. The rule may be such that the rule is notified by the higher layer signaling for each UE or is judged by the UE based on the UE index (e.g., C-RNTI).

For example, when three bits of bit fields (bit strings) are notified to each UE, and a first UE is notified to sort and use in the order of the bit positions (1, 2, 3) in the received bit string, and a second UE is notified to sort and use in the order of the bit positions (3, 2, 1) in the received bit string, when the bit string received by the first UE and the second UE is [110], the first UE may determine the bit string to use as [110] and the second UE may determine the bit string to use as [011].

For example, when three bits of bit fields (bit strings) are notified to each UE, and the UE judges the rule based on the UE index (e.g., C-RNTI), the first UE may judge to use the bits in the received bit string in the order of (1, 2, 3), and the second UE may be notified to sort and use the bits in the received bit string in the order of (3, 2, 1).

The UE may assume that the rule of sorting (converting) the bit fields is defined only with respect to a specific bit field (e.g., TPC command for the scheduled PUCCH, PRI field, HARQ feedback timing indicator field). Furthermore, for the rule of sorting the bit fields, the UE may be configured with the sorting rule separately for each specific bit field or may be configured with the bit sorting rule with respect to a variable bit length.

The UE may determine the number of bits to use based on a certain rule for the field value included in the plurality of UE-common DCIs.

In this case, for example, when a certain bit field (bit string) is notified to a plurality of UEs (first UE and second UE), the first UE may be assumed to use all notified bits, and another UE may be assumed to use the most significant (from left) or least significant (from right) two bits of the notified bits. For example, when the bit string received by the first UE and the second UE is [111], the first UE may determine the bit string to use as [111] and the second UE may judge that the received bit string is [11] and determine that the bit string to use is [011].

Furthermore, each UE may determine the resource/value to use for the PUCCH by interpreting at least one of the following bit fields:

Bit field of DCI
Minimum/maximum CCE index (PRB/RE index) of PDCCH that carries DCI
PDCCH (CCE) aggregation level
Search space index
CORESET index
PRG (PRB) index of start/end of PDSCH
Number of MIMO layers of PDSCH Note that the field used by the UE of the fields described above may be configured to the UE by the higher layer signaling or may be determined by the UE index (e.g., C-RNTI) based rule.

In this case, a certain UE determines the PUCCH resource to use based on the bit field of the DCI, and another UE determines the PUCCH resource to use based on both the bit field of the DCI and the CCE index, so that even when a common DCI (DCI bit field) is notified to each UE, the HARQ-ACK can be transmitted using the PUCCH resource that is different for each UE.

According to the third embodiment, the overlapping of the PUSCH/PUCCH transmission resources can be avoided while suppressing increase in the overhead of the DCI to be notified to a plurality of UEs, thus enabling a suitable communication.

Fourth Embodiment

In a fourth embodiment, a case where a plurality of UEs transmit the HARQ-ACK using the non-orthogonal UL resource will be described. Specifically, a case where each UE receives a plurality of UE-common/UE-dedicated DCIs, the DCI schedules a plurality of UE-common PDSCHs (multicast PDSCHs), and each UE is instructed (determines) the time and frequency resources of the PUCCH/PUSCH for transmitting the HARQ-ACK corresponding to the multicast PDSCH by the DCI will be described. Note that in the present embodiment, at least one of the second embodiment and the third embodiment may be applied to some UEs of the plurality of UEs.

In the present embodiment, a case where each UE receives a plurality of UE-common DCIs will be described, but the content of the present embodiment can be also similarly applied to a case where each UE receives the UE-dedicated DCI. Furthermore, a case where the PUCCH in the present embodiment is a sequence based PUCCH (e.g., PF0) will be described. The sequence based PUCCH and the PUCCH not involving the DMRS may be interchangeably interpreted.

Figure 5:
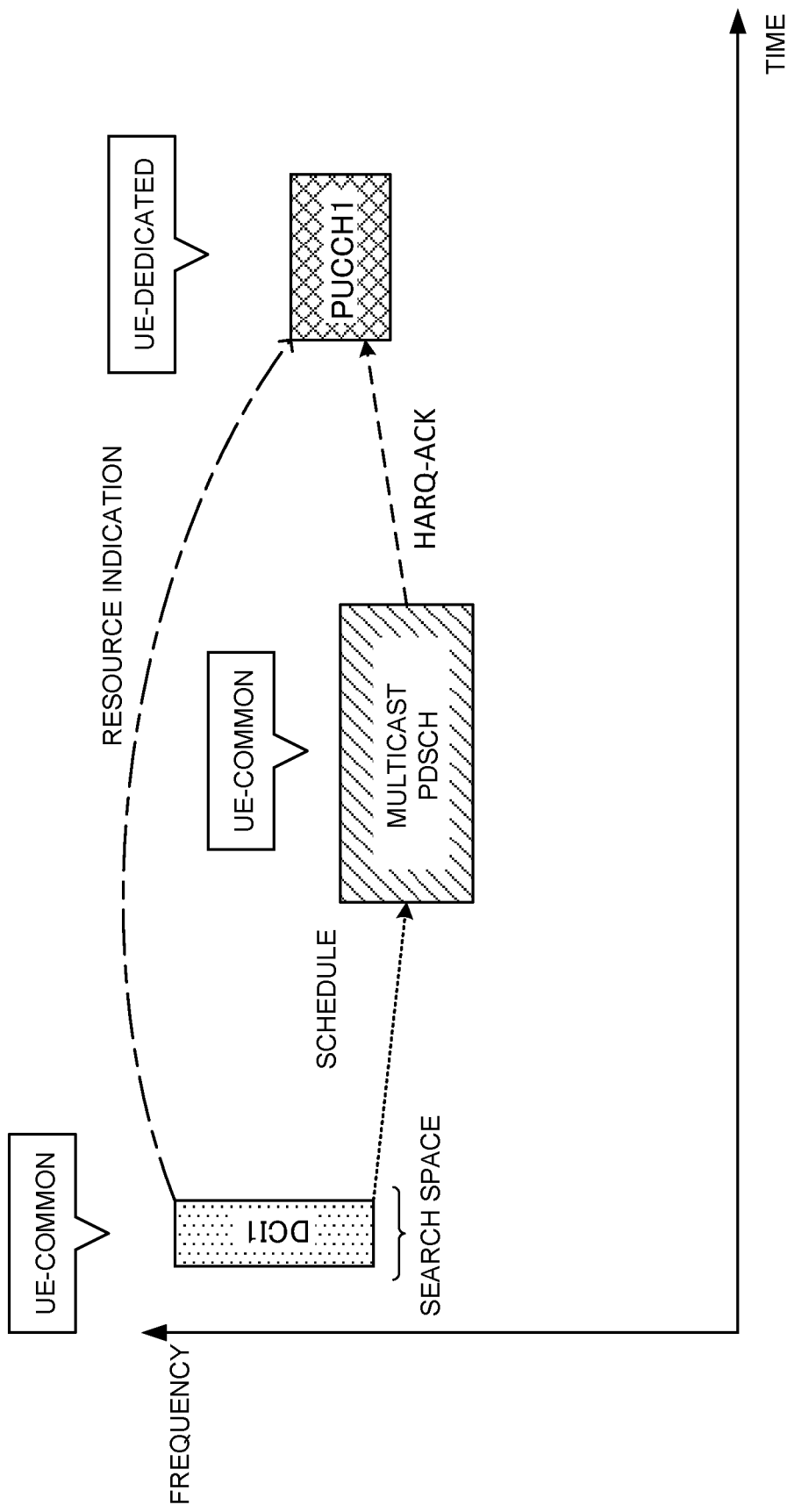
FIG. 5 is a diagram to show an example of the multicast PDSCH receiving procedure.

FIG. 5 is a view showing an example of the multicast PDSCH receiving procedure. In FIG. 5, a certain UE monitors each UE-common DCI (DCI1), receives the multicast PDSCH, and transmits the HARQ-ACK corresponding to the multicast PDSCH using a plurality of UE-common PUCCH resources (PUCCH1).

Note that the number of DCIs and PUCCH resources, and the time/frequency allocating positions shown in FIG. 5 are merely an example, and this is not the sole case.

In the transmission of the HARQ-ACK, two (ACK and NACK) resources (PRB or RE) are reserved to transmit one bit of HARQ-ACK. When a plurality of UEs transmit the HARQ-ACK corresponding to the multicast PDSCH in the common PUCCH resource, the HARQ-ACK resources transmitted by the plurality of UEs may overlap depending on the number of UEs or the size of the PUCCH resource. Furthermore, even when the HARQ-ACK resources transmitted by the plurality of UEs do not overlap when a plurality of UEs transmit the HARQ-ACK in the common PUCCH resource, the PUCCH resources are pressured.

Thus, hereinafter, a method for overlapping a plurality of HARQ-ACK resources (at least one of ACK resource and NACK resource) respectively used for the plurality of UEs in the time domain and the frequency domain will be described.

When the HARQ-ACK corresponding to the multicast PDSCH is transmitted in a plurality of UE-common PUCCH resources, the UE may assume that the ACK resources allocated to a plurality of UEs overlap, and transmit the HARQ-ACK.

In other words, each UE transmits the ACK using the ACK resources overlapping each other when the receiving process (e.g., demodulation, decoding, and so on) of the multicast PDSCH of the HARQ-ACK corresponding to the multicast PDSCH is successful, and transmits the NACK in the NACK resources that do not overlap when the receiving process of the multicast PDSCH is a failure.

Figure 6:
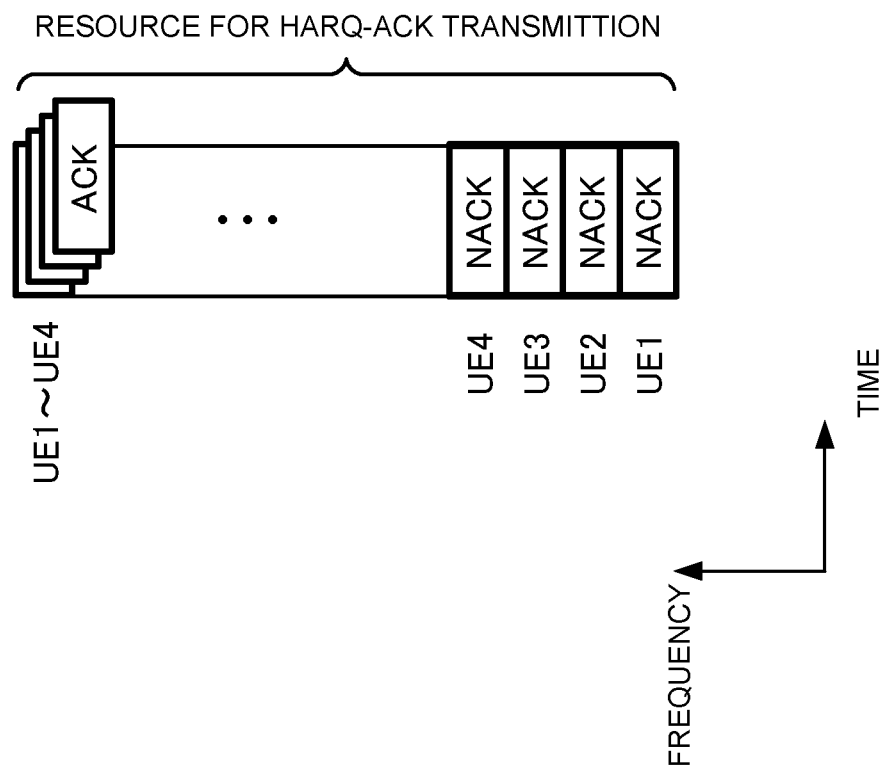
FIG. 6 is a diagram to show an example of a method for transmitting HARQ-ACK corresponding to the multicast PDSCH in a plurality of UE-common PUCCH resources.

FIG. 6 is a diagram to show an example of a method for transmitting the HARQ-ACK corresponding to the multicast PDSCH in a plurality of UE-common PUCCH resources. One block of resources in FIG. 6 may be a PRB or may be a RE (or subcarrier). In FIG. 6, when the HARQ-ACK corresponding to the multicast PDSCH is transmitted in a plurality of UE (UE1 to UE4) PUCCH resources, the ACK resources allocated to each UE are overlapped and the NACK resources allocated to each UE are not overlapped.

Note that the number of UEs and the ACK/NACK transmission resources shown in FIG. 6 are merely an example, and this is not the sole case.

An operation of the side that receives the HARQ-ACK (ACK and NACK) transmitted from a plurality of UEs in this case will now be described. In the present disclosure, the HARQ-ACK receiving side has been described as NW, but this is not the sole case.

The NW may detect whether a plurality of UEs performed ACK transmission based on the received power of the ACK transmitted from the plurality of UEs. When the received power of the ACK transmitted from the plurality of UEs is greater than or equal to a threshold value (greater than threshold value), the NW judges that all the plurality of UEs succeeded in the receiving process of the multicast PDSCH, and may not perform re-transmission of the multicast PDSCH. The threshold value may be a value with which it can be presumed that all the plurality of UEs performed the ACK transmission. When the received power of the ACK transmitted from the plurality of UEs is less than the threshold value (less than or equal to threshold value), the NW judges that a UE that failed in the receiving process of the multicast PDSCH exists and may perform re-transmission of the multicast PDSCH.

Furthermore, when the ACK resources allocated to the plurality of UEs are to be overlapped, the NACK resource may not be allocated to the plurality of UEs. In this case, the UE that succeeded in the receiving process of the multicast PDSCH of a plurality of UEs may transmit the ACK using the ACK transmission resource overlapping the ACK transmission resource of other UEs, and the UE that failed in the receiving process of the multicast PDSCH may not transmit the NACK.

Figure 7B:
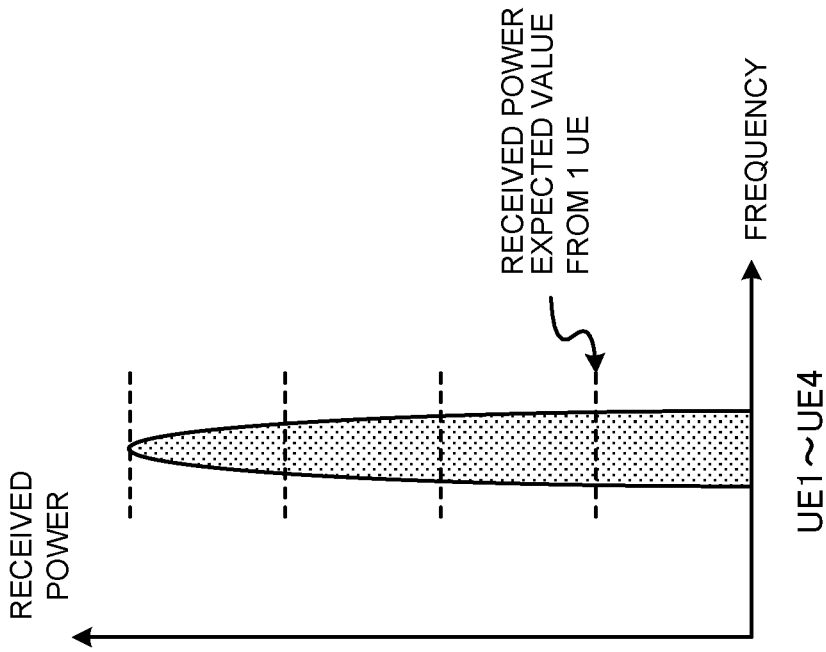
FIGS. 7A and 7B are diagrams to show an example of a detection of the HARQ-ACK transmitted from a plurality of UEs in the NW.
Figure 7A:
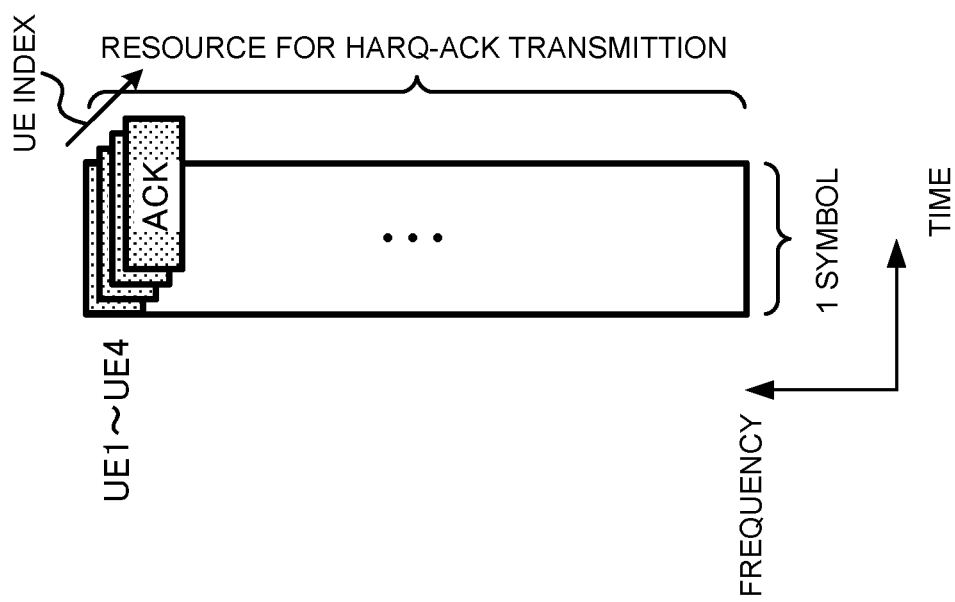

FIGS. 7A and 7B are diagrams to show an example of a detection of the HARQ-ACK transmitted from a plurality of UEs in the NW. In FIG. 7A, all the plurality of UEs (UE1 to 4) transmit the ACK using resources overlapping each other. In this case, the NW measures the received power of the ACK (FIG. 7B), and when the number of UEs that transmitted the ACK is presumed to be 4, judges that all the plurality of UEs succeeded in the receiving process of the multicast PDSCH, and does not perform re-transmission of the multicast PDSCH.

Note that the number of UEs, ACK/NACK transmission resources, and the ACK/NACK received power by the NW shown in FIGS. 7A and 7B are merely an example, and this is not the sole case.

Furthermore, when the HARQ-ACK corresponding to the multicast PDSCH is transmitted in a plurality of UE-common PUCCH resources, the UE may assume that the NACK resources allocated to a plurality of UEs overlap, and may perform the HARQ-ACK transmission.

When the NACK resources allocated to a plurality of UEs are overlapped, the ACK resource may not be allocated to a plurality of UEs. In other words, each UE may transmit the NACK in the overlapping resource when failing in the receiving process of the multicast PDSCH of the HARQ-ACK corresponding to the multicast PDSCH, and may not transmit the ACK when succeeding in the receiving process of the multicast PDSCH.

The NW may detect whether the plurality of UEs performed NACK transmission based on the received power of the NACK transmitted from the plurality of UEs in the overlapping resource. When the NACK transmission by at least one UE is detected, the NW judges that a UE that failed in the receiving process of the multicast PDSCH exists and may perform re-transmission of the multicast PDSCH. Furthermore, when the NACK transmission by at least one UE is not detected, the NW judges that all the plurality of UEs succeeded in the receiving process of the multicast PDSCH, and may not perform re-transmission of the multicast PDSCH.

Figure 8C:
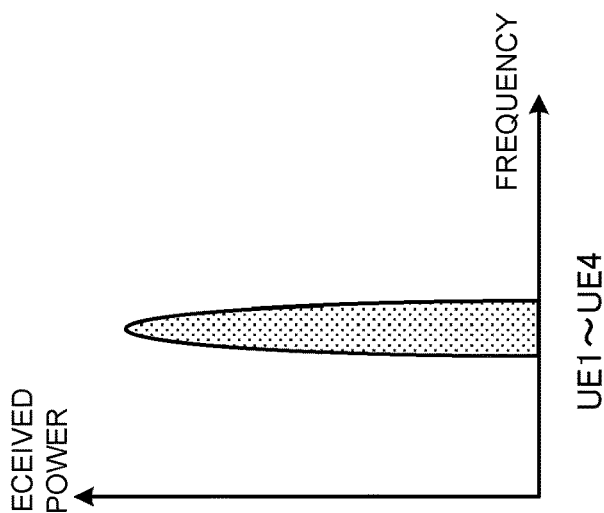
FIGS. 8A to 8C are diagrams to show an example of a method for transmitting the HARQ-ACK corresponding to the multicast PDSCH in the plurality of UE-common PUCCH resources, and an example of the detection of the HARQ-ACK transmitted from the plurality of UEs in the NW.
Figure 8B:
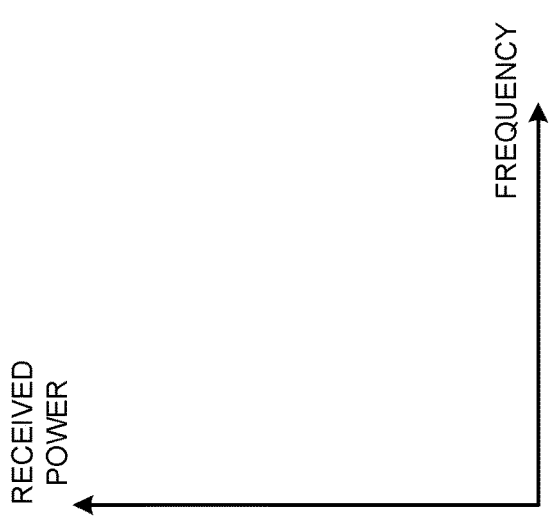
Figure 8A:
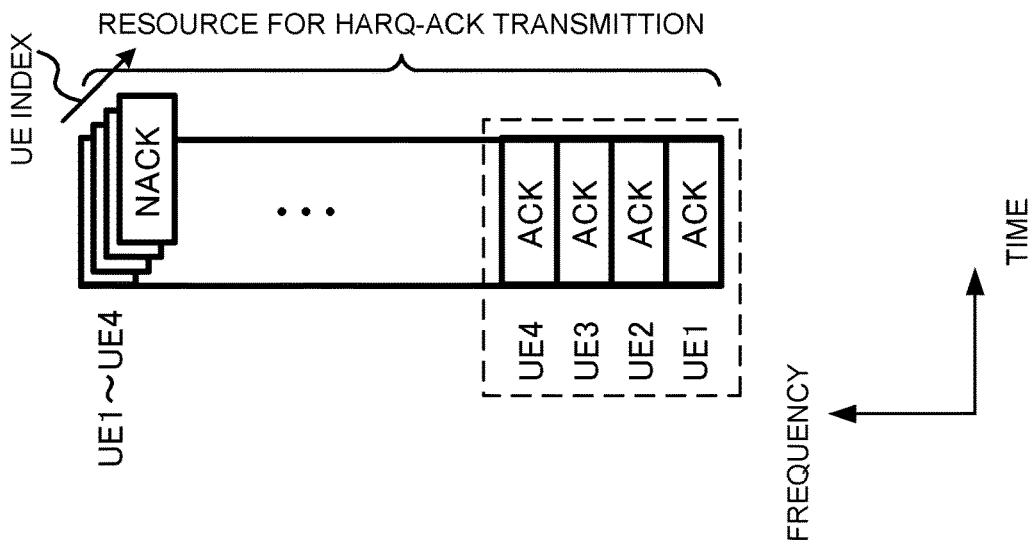

FIGS. 8A to 8C are diagrams to show an example of a method for transmitting the HARQ-ACK corresponding to the multicast PDSCH in a plurality of UE-common PUCCH resources, and an example of the detection of the HARQ-ACK transmitted from a plurality of UEs in the NW. In FIG. 8A, the UE that failed in the receiving process of the multicast PDSCH of a plurality of UEs (UE1 to UE4) transmits the NACK using the resource overlapping the NACK transmission resource of other UE. The UE that succeeded in the receiving process of the multicast PDSCH transmits the ACK.

In this case, the NW measures the received power of the NACK, and when the number of UEs that transmitted the NACK is presumed to be at least one, judges that one of the UEs failed in the receiving process of the multicast PDSCH and performs re-transmission of the multicast PDSCH. In the example shown in FIG. 8B, the NW measures the received power of the NACK, presumes that the number of UEs that transmitted the NACK does not exist, and does not perform re-transmission of the multicast PDSCH. In the example shown in FIG. 8C, when the NW measures the received power of the NACK, and the number of UEs that transmitted the NACK is presumed to be greater than or equal to one, the NW performs re-transmission of the multicast PDSCH.

In FIG. 8A, the NACK resource for the multicast PDSCH may be allocated, and the ACK resource may not be allocated. In this case, the UE that failed in the receiving process of the multicast PDSCH of a plurality of UEs (UE1 to UE4) transmits the NACK using the resource overlapping the NACK transmission resource of other UE. The UE that succeeded in the receiving process of the multicast PDSCH does not transmit the ACK.

Note that the number of UEs, ACK/NACK transmission resources, and the ACK/NACK received power by the NW shown in FIGS. 8A to 8C are merely an example, and this is not the sole case.

Furthermore, each UE may transmit the PUCCH (NACK) when failing in the receiving process of the PDSCH in the reception of the multicast PDSCH. In this case, each UE may not transmit the PUCCH (ACK) when succeeding in the receiving process of the PDSCH in the reception of the multicast PDSCH.

In this case, the NW can judge the existence of the UE transmitting the NACK according to the received power of the PUCCH. In other words, when the NW does not receive the NACK, the NW can judge that the plurality of UEs succeeded in receiving the PDSCH. Furthermore, when at least one UE transmitted the NACK, the NW may perform the re-transmission control of the HARQ. In this case, when a different DMRS sequence (or at least one of cyclic shift and orthogonal cover code (OCC)) is allocated for each UE, the NW may judge the UE that needs to perform re-transmission of the PDSCH according to the DMRS sequence (or at least one of cyclic shift and orthogonal cover code (OCC)). Furthermore, when the NW cannot judge the UE that needs to perform retransmission of the PDSCH, the NW may perform re-transmission of the PDSCH to a plurality of UEs.

In this case, even when the UE whose reception of the multicast PDSCH cannot be recognized exists, a more efficient communication can be performed since the error rate (approximately 1%) of the DCI is small with respect to the error rate (approximately 10%) of the PDSCH.

As shown in FIG. 7A described above, each UE may transmit the PUCCH (ACK) when succeeding in the receiving process of the PDSCH in the reception of the multicast PDSCH. In this case, each UE may not transmit the PUCCH (NACK) when failing in the receiving process of the PDSCH in the reception of the multicast PDSCH.

In this case, when the received power of the ACK transmitted from the plurality of UEs is greater than or equal to a threshold value (greater than threshold value), the NW judges that all the plurality of UEs succeeded in the receiving process of the multicast PDSCH, and may not perform re-transmission of the multicast PDSCH. The threshold value may be a value with which it can be presumed that all the plurality of UEs performed the ACK transmission. When the received power of the ACK transmitted from the plurality of UEs is less than the threshold value (less than or equal to the threshold value), the NW judges that the UE that failed in the receiving process of the multicast PDSCH exists, and may perform re-transmission of the multicast PDSCH.

In this case, communication with ensured reliability can be performed with respect to all the plurality of UEs.

FIGS. 9A and 9B are diagrams to show an example of a method for transmitting the HARQ-ACK (PUCCH) corresponding to the multicast PDSCH in a plurality of UE-common PUCCH resources. In FIG. 9A, each UE transmits the PUCCH (NACK) when failing in the receiving process of the PDSCH. In FIG. 9B, each UE does not transmit the PUCCH (ACK) when succeeding in the receiving process of the PDSCH.

Note that the number of DCIs, PDSCHs, and PUCCH resources, and the time/frequency allocating positions shown in FIGS. 9A and 9B are merely an example, and this is not the sole case.

Note that the PUCCH transmitted in the present embodiment is not limited to the sequence based PUCCH (e.g., PUCCH of PF0), and may be PUCCH or PUSCH of other formats (e.g., PF1 to PF4, PUCCH involving DMRS). Based on the PF applied to the PUCCH, the UE may judge to perform the NACK transmission and not perform the ACK transmission as described above, or may judge to perform the ACK transmission and not perform the NACK transmission with respect to the multicast PDSCH.

Therefore, according to the fourth embodiment, a plurality of UEs can appropriately transmit the HARQ-ACK using the non-orthogonal UL resource, and hence degradation of the uplink resource utilization efficiency can be suppressed.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
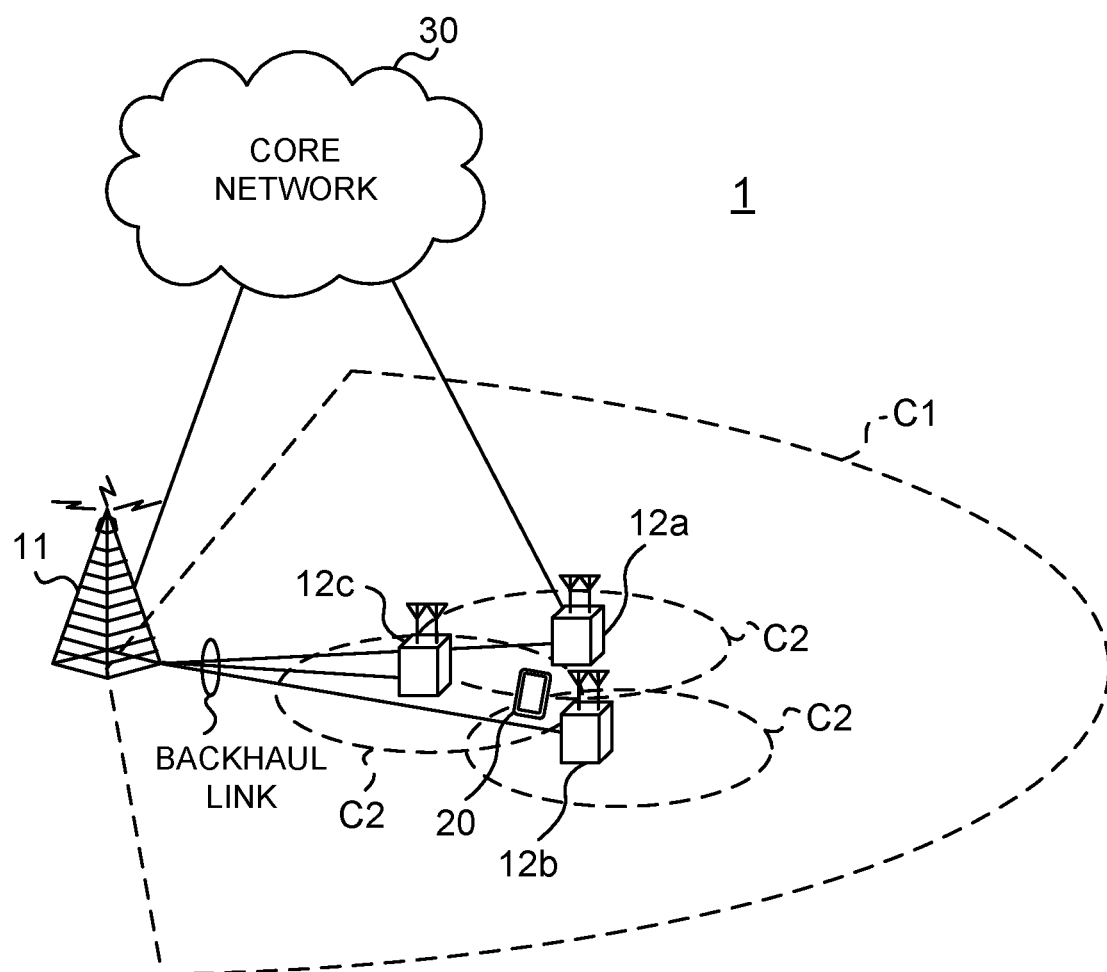
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
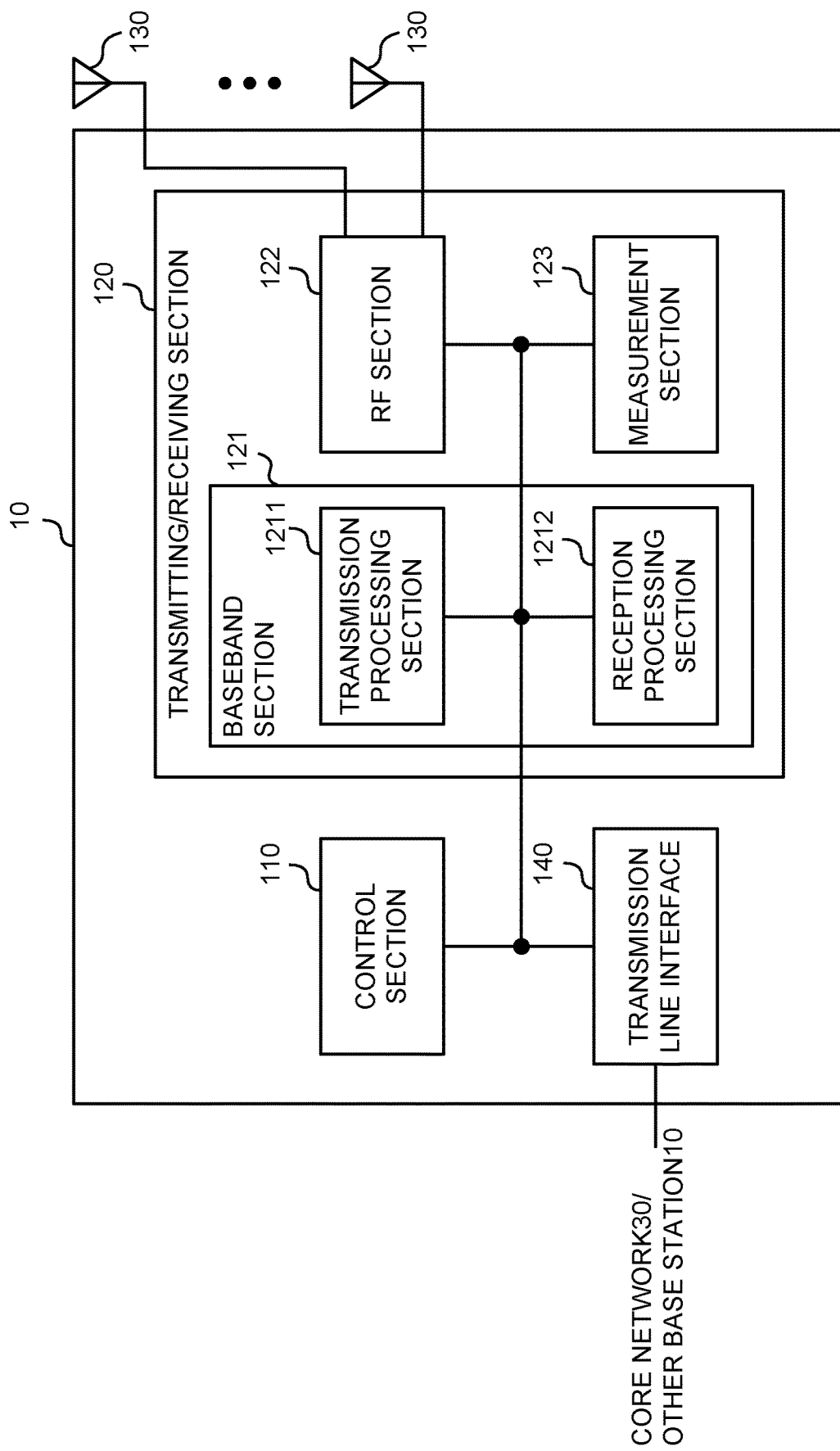
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit the downlink control information (DCI) for scheduling the downlink shared channel of the multicast. The control section 110 may control the reception of the Hybrid Automatic Repeat reQuest ACKnowledgement (HARQ-ACK) with respect to the downlink shared channel based on the DCI (first and second embodiments).

The transmitting/receiving section 120 may transmit the downlink control information (DCI) for scheduling the downlink shared channel of the multicast. The control section 110 may be a control section that controls the reception of the Hybrid Automatic Repeat reQuest ACKnowledgement (HARQ-ACK) with respect to the downlink shared channel based on the DCI. The DCI may be common to a plurality of terminals (first and third embodiments).

The transmitting/receiving section 120 may transmit the downlink control information (DCI) for scheduling the downlink shared channel of the multicast. The control section 110 may determine the time and frequency resources for receiving the Hybrid Automatic Repeat reQuest ACKnowledgement (HARQ-ACK) with respect to the downlink shared channel based on the DCI. The resources may have at least a part of the resources used by a plurality of terminals overlapping (first and fourth embodiments).

(User Terminal)

Figure 12:
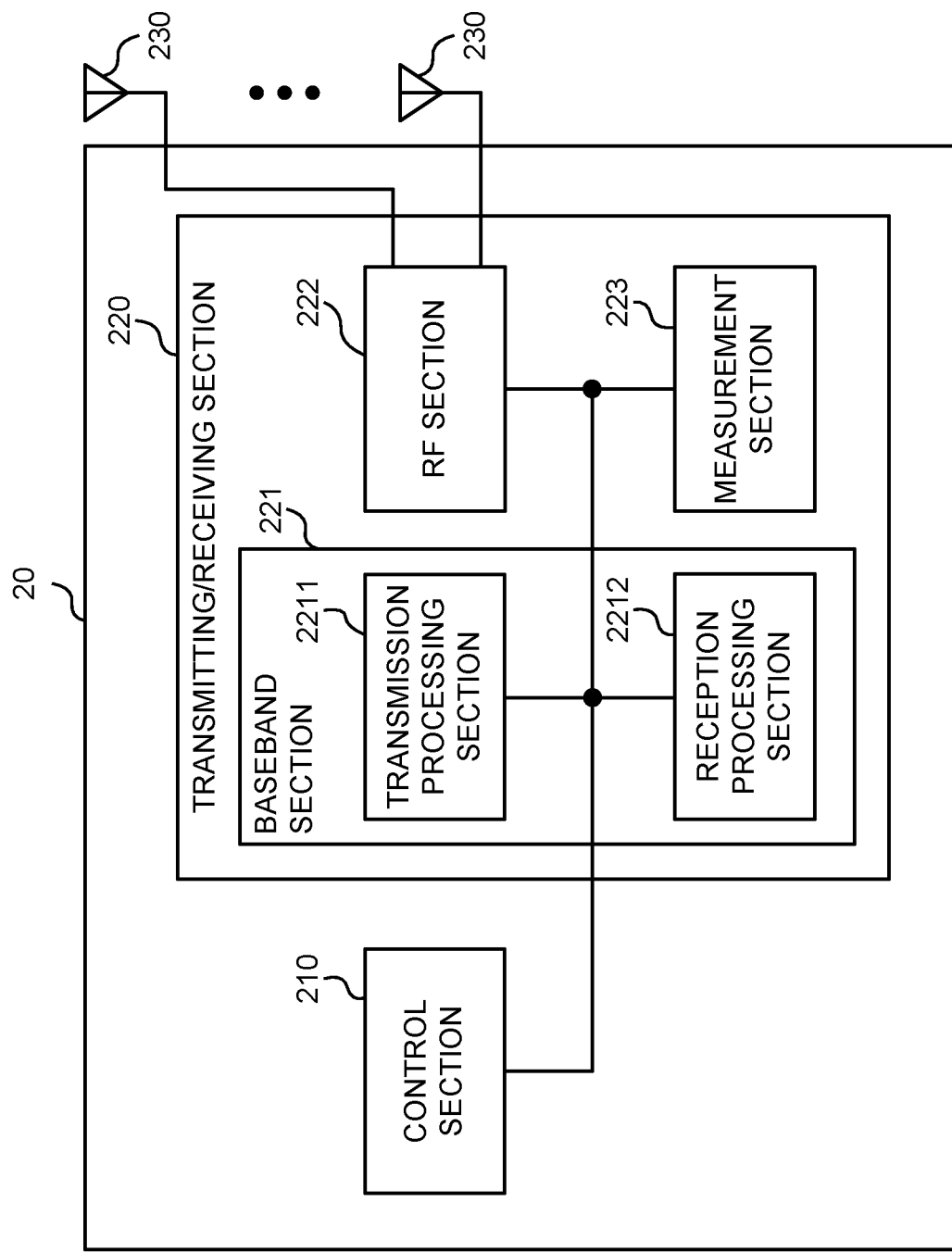
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive the downlink control information (DCI) for scheduling the downlink shared channel of the multicast. The control section 210 may control the transmission of the Hybrid Automatic Repeat reQuest ACKnowledgement (HARQ-ACK) with respect to the downlink shared channel based on the DCI (first and second embodiments).

The control section 210 may determine the time and frequency resources for transmitting the HARQ-ACK based on the DCI. The resource may not overlap the uplink control channel (PUCCH) resource transmitted by another terminal (second embodiment).

When the multicast is configured by the higher layer signaling and the DCI is scrambled by a specific radio network temporary identifier, the control section 210 may control the receiving process of the downlink shared channel by interpreting a specific field included in the DCI as a multicast parameter (second embodiment).

The specific field may be a modulation and coding scheme field (second embodiment).

The transmitting/receiving section 220 may receive the downlink control information (DCI) for scheduling the downlink shared channel of the multicast. The control section 210 may control the transmission of the Hybrid Automatic Repeat reQuest ACKnowledgement (HARQ-ACK) with respect to the downlink shared channel based on the DCI. The DCI may be common to a plurality of terminals (first and third embodiments).

The control section 210 may determine the time and frequency resources for transmitting the HARQ-ACK based on the DCI. The resource may not overlap the uplink control channel (PUCCH) resource transmitted by another terminal (third embodiment).

When the resource for transmitting the HARQ-ACK is a resource based on the configured grant, the control section 210 may determine to transmit the HARQ-ACK (third embodiment).

When the multicast is configured by the higher layer signaling and the DCI is scrambled by a specific radio network temporary identifier, the control section 210 may control the receiving process of the downlink shared channel by interpreting a specific field included in the DCI as a multicast parameter (third embodiment).

The transmitting/receiving section 220 may receive the downlink control information (DCI) for scheduling the downlink shared channel of the multicast. The control section 210 may determine the time and frequency resources for transmitting the Hybrid Automatic Repeat reQuest Acknowledge (HARQ-ACK) with respect to the downlink shared channel based on the DCI. The resource may overlap with at least a part of the resource used by another terminal (first and fourth embodiments).

The control section 210 may control to transmit the acknowledgement (ACK) with respect to the downlink shared channel by using the resource overlapping the ACK from another terminal in the resource (fourth embodiment).

The control section 210 may control to transmit the negative acknowledgement (NACK) with respect to the downlink shared channel by using the resource overlapping the NACK from another terminal in the resource (fourth embodiment).

When the receiving process of the downlink shared channel is successful, the control section 210 may control so as not to transmit the acknowledgement (ACK) with respect to the downlink shared channel (fourth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

For example, a base station, a user terminal, and so on according to one embodiment of the present disclosure may function as a computer that executes the processes of the radio communication method of the present disclosure.

Figure 13:
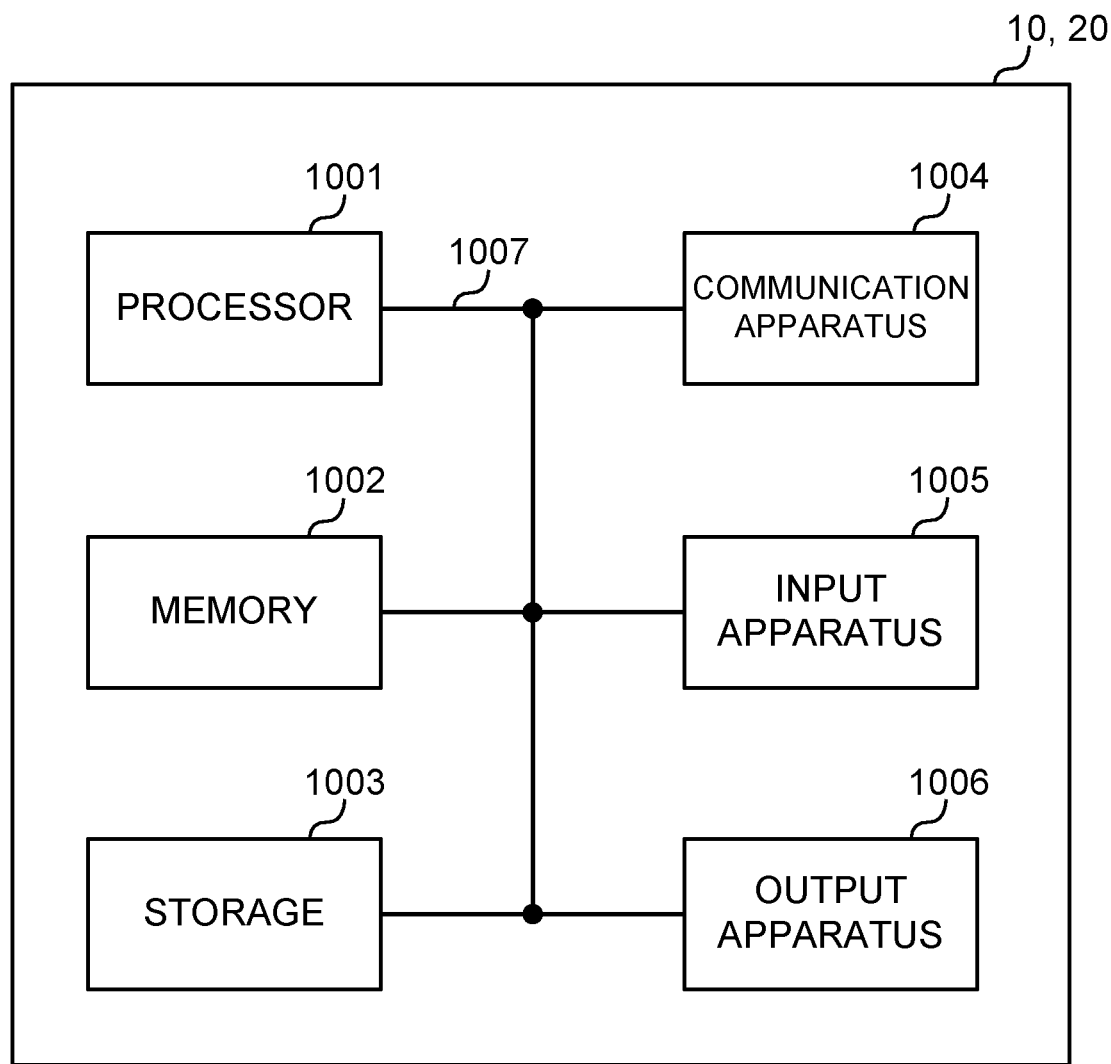
FIG. 13 is a diagram to show an example of a hardware structure of the base station and the user terminal according to one embodiment.

FIG. 13 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, integer, decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a receiver that receives a configuration for a physical uplink control channel (PUCCH) corresponding to a multicast physical downlink shared channel (PDSCH), downlink control information (DCI) for scheduling the PDSCH, and the PDSCH, wherein the configuration is transmitted using radio resource control (RRC) signaling; and
   a processor that determines a PUCCH resource for hybrid automatic repeat request acknowledgement (HARQ-ACK) corresponding to the PDSCH, based on the configuration, a PUCCH resource indicator field included in the DCI, and a control channel element (CCE) index of a physical downlink control channel (PDCCH) that carries the DCI,
   wherein the DCI is common to a plurality of terminals, and
   wherein a PUCCH format for the PUCCH resource is a PUCCH format without a demodulation reference signal.

2. The terminal according to claim 1, wherein the receiver monitors the DCI in a common search space for multicast.

3. The terminal according to claim 1, wherein cyclic redundancy check (CRC) of the DCI is scrambled by a group-common radio network temporary identifier (RNTI).

4. A radio communication method for a terminal, comprising:
   receiving a configuration for a physical uplink control channel (PUCCH) corresponding to a multicast physical downlink shared channel (PDSCH), downlink control information (DCI) for scheduling the PDSCH, and the PDSCH, wherein the configuration is transmitted using radio resource control (RRC) signaling; and
   determining a PUCCH resource for hybrid automatic repeat request acknowledgement (HARQ-ACK) corresponding to the PDSCH, based on the configuration, a PUCCH resource indicator field included in the DCI, and a control channel element (CCE) index of a physical downlink control channel (PDCCH) that carries the DCI,
   wherein the DCI is common to a plurality of terminals, and
   wherein a PUCCH format for the PUCCH resource is a PUCCH format without a demodulation reference signal.

5. A base station comprising:
   a transmitter that transmits a configuration for a physical uplink control channel (PUCCH) corresponding to a multicast physical downlink shared channel (PDSCH), downlink control information (DCI) for scheduling the PDSCH, and the PDSCH, wherein the configuration is transmitted using radio resource control (RRC) signaling; and
   a processor that indicates a PUCCH resource for hybrid automatic repeat request acknowledgement (HARQ-ACK) corresponding to the PDSCH, by using the configuration, a PUCCH resource indicator field included in the DCI, and a control channel element (CCE) index of a physical downlink control channel (PDCCH) that carries the DCI,
   wherein the DCI is common to a plurality of terminals, and
   wherein a PUCCH format for the PUCCH resource is a PUCCH format without a demodulation reference signal.

6. A system comprising a base station and a terminal, wherein
   the base station comprises:
      a transmitter that transmits a configuration for a physical uplink control channel (PUCCH) corresponding to a multicast physical downlink shared channel (PDSCH), downlink control information (DCI) for scheduling the PDSCH, and the PDSCH, wherein the configuration is transmitted using radio resource control (RRC) signaling; and
      a processor that indicates a PUCCH resource for hybrid automatic repeat request acknowledgement (HARQ-ACK) corresponding to the PDSCH, by using the configuration, a PUCCH resource indicator field included in the DCI, and a control channel element (CCE) index of a physical downlink control channel (PDCCH) that carries the DCI,
      wherein a PUCCH format for the PUCCH resource is a PUCCH format without a demodulation reference signal, and
   the terminal comprises:
      a receiver that receives the configuration, the DCI, and the PDSCH; and
      a processor that determines the PUCCH resource based on the configuration, the PUCCH resource indicator field, and the CCE index,
      wherein the DCI is common to a plurality of terminals.

* * * * *